Nov. 1, 1966 W. H. SEARIGHT 3,282,066
APPARATUS FOR MAKING GLASS BEADS
Original Filed March 22, 1962 2 Sheets-Sheet 1

INVENTOR.
WILLIAM H. SEARIGHT
BY Malcolm W. Fraser
ATTORNEY

# United States Patent Office 3,282,066
Patented Nov. 1, 1966

3,282,066
APPARATUS FOR MAKING GLASS BEADS
William H. Searight, Toledo, Ohio, assignor to Cataphote Corporation, Toledo, Ohio, a corporation of Ohio
Original application Mar. 22, 1962, Ser. No. 181,563. Divided and this application Feb. 1, 1966, Ser. No 534,593
2 Claims. (Cl. 65—142)

This is a division of application Serial No. 181,563, filed March 22, 1962, now abandoned.

This invention relates to the manufacture of macroscopic spherical glass beads, such as are used, for example, for highway striping and reflective signs.

One accepted method of producing these glass beads is by feeding crushed glass into a flame so that the glass particles are carried along with the combustion gases and products of combustion, and during such passage, the glass particles are melted and due to the action of surface tension, acquire a spherical shape. Manifestly this procedure necessitates that the glass first be produced, and then crushed to the proper size before it can be heated and formed into spherical shapes.

An object of this invention is to produce a new and improved apparatus for making macroscopic spherical glass beads directly from molten glass.

In accordance with this invention, glass is melted and discharged from a melting tank or collecting chamber into a plurality of relatively small vertically descending streams arranged in annular row, the cross section of each stream being of the order of .0005 of one inch to one-fourth of an inch. The glass streams while in liquid state gravitate past a dispersing device which is disposed centrally thereof and from which radiate a plurality of jets of high temperature, high velocity streams directed at approximately right angles to the descending streams. The streams may take the form of burners creating high temperature flames or jets of superheated steam or hot air. The particles of glass are dispersed by the streams and impelled laterally through a heated zone sufficiently so that the glass particles have time to be drawn into the form of spheres by surface tension. Thereafter the particles are air cooled and collected.

Figure 1:
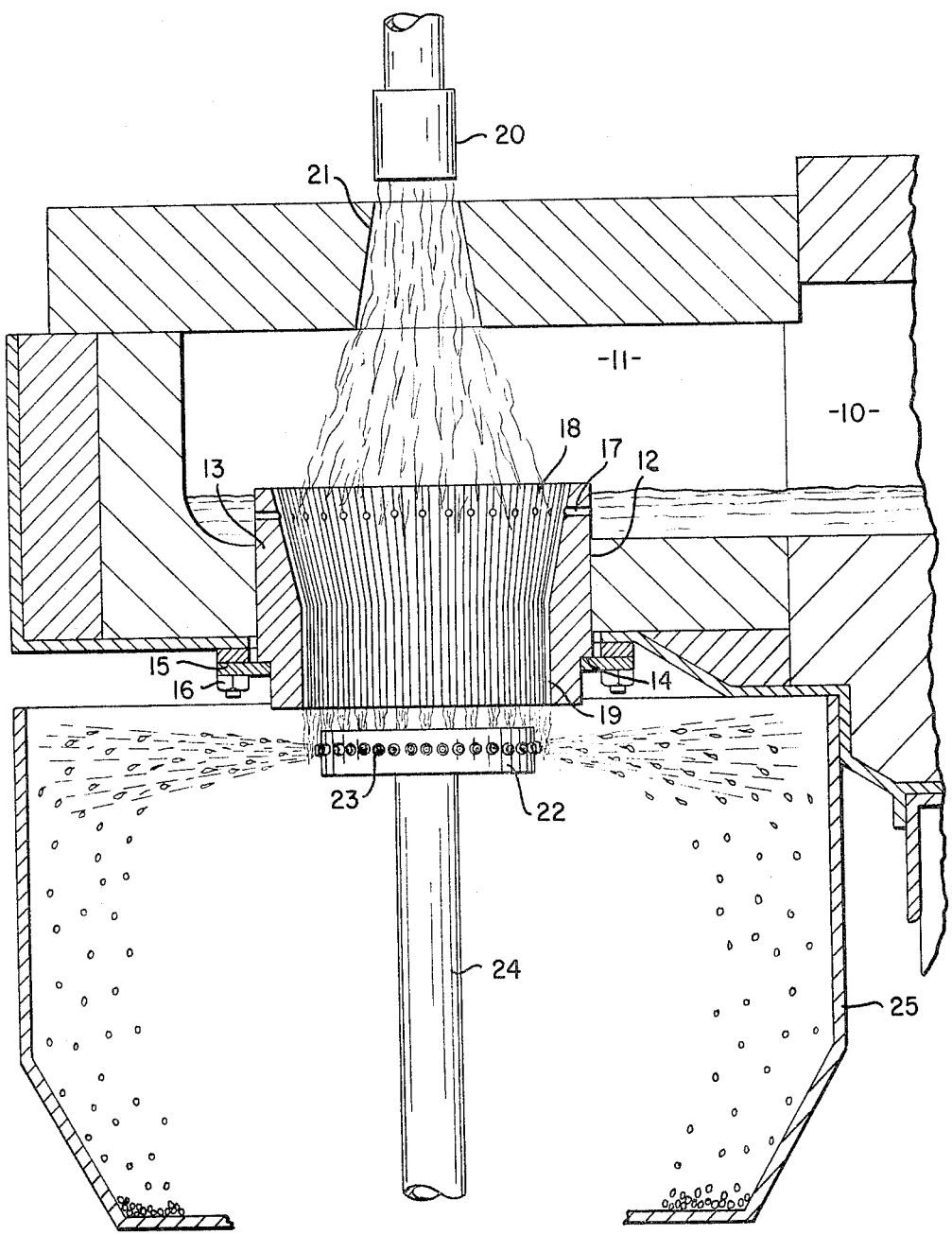
Figure 2:
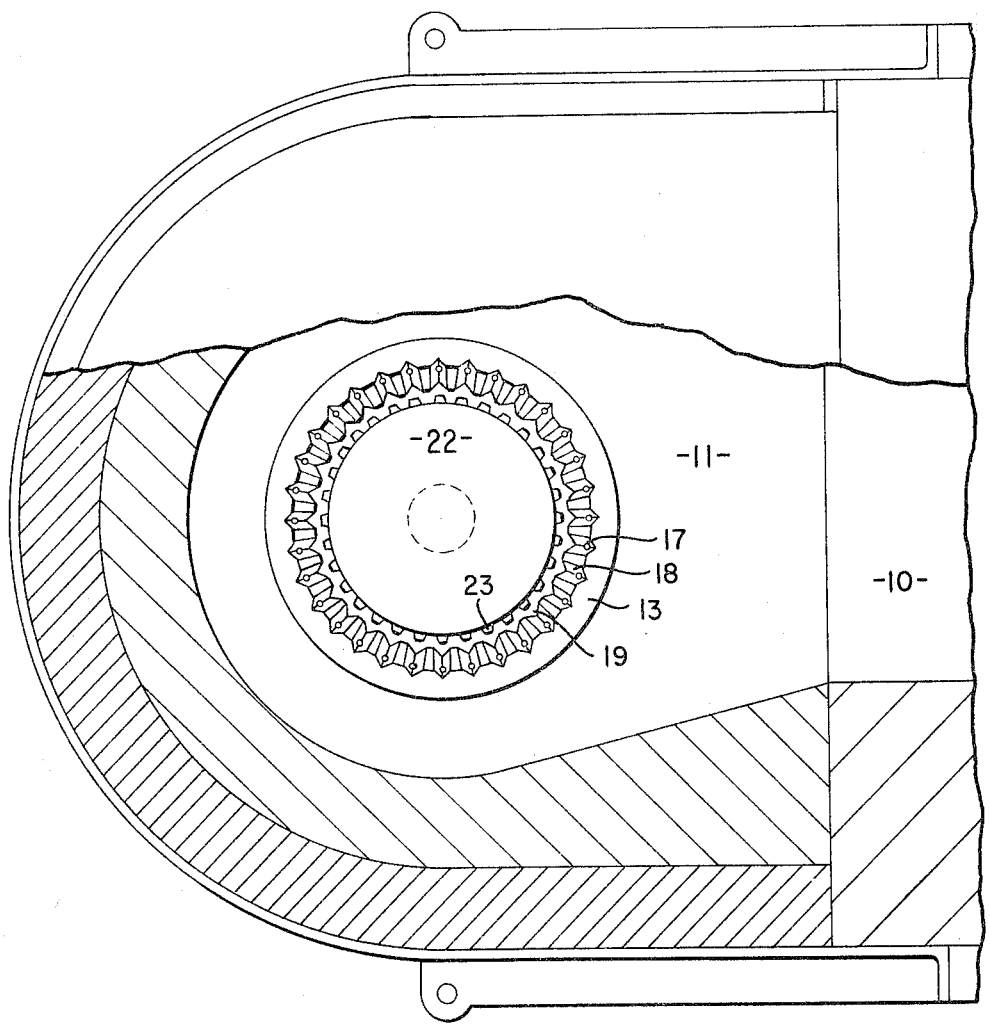

For purposes of illustration, but not of limitation an apparatus for practicing the method is shown in the accompanying drawings in which FIGURE 1 is a somewhat diagrammatic view in vertical section of an apparatus for producing glass spheres from an annular row of relatively fine glass streams; and FIGURE 2 is a top plan view of the apparatus shown in FIGURE 1 with a portion of the top wall removed for purposes of clarity.

The illustrated embodiment of the invention comprises a glass melting furnace 10 of any suitable form and from the furnace the molten glass flows to a collecting chamber 11 which is formed with a hole 12 in the bottom wall. Fitting the hole 12 is an annular bushing or weir 13 which is of platinum or a metal or ceramic having the desired characteristics. As shown the bushing 13 has a shoulder 14 adjacent its bottom end against which a flat supporting ring 15 rests. The ring 15 is secured in position by a series of bolt and nut assemblies 16. The upper end of the bushing 13 is spaced above the level of the molten glass although if desired the molten glass may overflow the top of the bushing. Spaced slightly beneath the upper end of the bushing is an annular series of lateral passages 17, the inner ends of which open into downwardly and inwardly inclined V-shaped trough-like passages 18 arranged in an annular row, there being one of these passages for each of the lateral passages 17. Since the lateral passages 17 are in this instance below the level of the molten glass, the glass can flow freely through the passages 17 into the V-shaped trough-like passages 18. The lower end of each trough-like passage 18 merges into a similar shaped vertical passage 19 which is open at its bottom end. The inclined passages 18 extend somewhat over half the vertical dimension of the bushing 13. Thus it will be noted that the molten glass flows first along the inclined V-shaped trough-like passages 18 and then vertically downward through the similar shaped passages 19. These passages produce an annular series of fine streams of glass gravitating from the upper portion of the bushing and falling freely from the bottom end thereof. Instead of the trough-like passages, an annular row of vertical holes may be formed in the bushing connecting at the top with the passages 17 and open at the bottom end.

It will be understood that by varying the size of the trough-like passages 18 and 19 and thereby controlling the diameter of the glass streams, the size of the beads may be controlled.

The inwardly tapered form of the upper portion of the bushing formed by the downwardly and inwardly inclined passages 18 enables the flame from a burner 20 disposed outside of the chamber 11 to project its blast through a tapered opening 21 and impinge upon the glass as it travels downwardly through the bushing 13. It is desirable that the viscosity of the molten stream be relatively low in order to effect proper dispersion thereof when contacted by a high velocity blast of gas as will hereinafter appear. A viscosity of the order of SAE 10 motor oil is satisfactory for this purpose. Assuming that a soda-lime type of glass is used for this purpose the glass should be heated to approximately 3000° F. Thus it will be manifest that the viscosity of the glass is low and is maintained at such temperature that it will flow readily.

Disposed within the annular row of glass streams gravitating from the bushing 13 is a cylindrical burner 22 which is formed with a series of nozzles or blast openings arranged in an annular row so that the gases from these openings or nozzles impinge upon the falling streams of glass and disperse the same laterally. The burner 22 is supported by a pedestal 24 through which the gas and fuel are suitably conducted. The glass streams are thus broken into small particles or droplets of liquid glass which almost immediately set into glass beads, sufficient heat being afforded to cause surface tension to spherulize the beads. The beads are blown generally in a lateral direction and eventually fall into a suitable collecting chamber 25. A substantial free fall in space of the beads is provided by the positioning of the collecting chamber, thereby providing for a sufficient setting time during the vertical fall of the beads.

The burner 22 may be of any suitable type characterized by the burning within a combustion chamber a combustible mixture of gas, air, oxygen, etc. the products of combustion being discharged through the restricted ports as a high velocity jet or blast. In the form shown the blast of gases discharged may be at a temperature of approximately 3100° F. and a velocity of approximately 1000 feet per second.

Numerous changes in details of construction, arrangement and operation may be effected without departing from the spirit of the invention, especially as defined in the appended claims.

What I claim is:
1. Apparatus for forming glass beads comprising:
means for gravitating a plurality of discrete glass streams of low viscosity arranged in an annular row;
means for directing a plurality of radially extending jets of high velocity heated gases normally against the direction of flow of said glass streams, said jets of high velocity heated gases being in numerical correspondence to said glass streams, said jets thereby causing said glass streams to be dispersed into a multiplicity of glass particles; and annular chamber means surrounding said jet directing means in spaced relation to provide a suspension zone wherein said particles are spherulized and fall into a lower temperature zone to be collected.

2. Apparatus for forming glass beads as claimed in claim 1 in which said gravitating means comprises a bushing having a vertical opening surrounded by an annular row of V-shaped channels, the upper portions of the channels inclining inwardly and downwardly and the lower portions being vertically disposed, and a burner for directing a heated blast against the inclined upper channel portions.

References Cited by the Examiner

UNITED STATES PATENTS

| | | | |
|---|---|---|---|
| 2,136,988 | 11/1938 | White | 18—2.5 |
| 2,582,561 | 1/1952 | Peyches. | |
| 2,616,124 | 11/1952 | Lyle | 65—142 |
| 2,936,480 | 5/1960 | Kleist | 65—6 |
| 3,074,257 | 1/1963 | Searight | 65—21 |
| 3,138,444 | 6/1964 | Searight et al. | 65—21 |
| 3,150,947 | 9/1964 | Bland | 65—21 |
| 3,243,273 | 3/1966 | Bland | 65—142 X |

DONALL H. SYLVESTER, *Primary Examiner.*

G. R. MYERS, *Assistant Examiner.*